United States Patent [19]
Crittenden

[11] Patent Number: 5,903,605
[45] Date of Patent: May 11, 1999

[54] JITTER DETECTION METHOD AND APPARATUS

[75] Inventor: Brent S. Crittenden, Phoenix, Ariz.

[73] Assignee: Intel Corporation, Santa Clara, Calif.

[21] Appl. No.: 08/926,632

[22] Filed: Sep. 10, 1997

Related U.S. Application Data

[63] Continuation of application No. 08/413,186, Mar. 30, 1995, abandoned.

[51] Int. Cl.$^6$ .................................................. H04B 3/46
[52] U.S. Cl. ............................ 375/226; 375/375; 327/7; 370/518
[58] Field of Search ................................. 375/226, 371, 375/373, 374, 375, 376; 370/516, 517, 518, 519; 327/2, 3, 5, 7, 146, 147, 150, 156, 159

[56] References Cited

U.S. PATENT DOCUMENTS

| | | | |
|---|---|---|---|
| 4,791,386 | 12/1988 | Shiga ........................................ | 331/1 A |
| 4,853,642 | 8/1989 | Otani et al. ............................... | 329/124 |
| 5,022,056 | 6/1991 | Henderson et al. ..................... | 370/517 |
| 5,220,581 | 6/1993 | Ferraiolo et al. ........................ | 375/226 |
| 5,309,428 | 5/1994 | Copley et al. ........................... | 375/226 |
| 5,400,370 | 3/1995 | Guo .......................................... | 375/359 |
| 5,402,443 | 3/1995 | Wong ....................................... | 375/371 |
| 5,442,664 | 8/1995 | Rust et al. ............................... | 375/371 |
| 5,481,563 | 1/1996 | Hamre ..................................... | 375/226 |
| 5,485,484 | 1/1996 | Williams et al. ........................ | 375/371 |
| 5,511,091 | 4/1996 | Saito ........................................ | 375/226 |
| 5,689,536 | 11/1997 | Iyota et al. .............................. | 375/226 |

*Primary Examiner*—Don N. Vo
*Attorney, Agent, or Firm*—Blakely, Sokoloff, Taylor & Zafman

[57] ABSTRACT

A jitter detection method and apparatus for informing an adaptive equalizer that the correlated jitter of transmitted data exceeds a predetermined jitter value. In one embodiment of the present invention, a jitter detection circuit receives transmitted data symbol pulses and clock signal pulses. The jitter detection circuit then compares a specified edge (e.g., the falling edge) of an incoming data pulse with the corresponding specified edge (e.g., the falling edge) of a clock signal pulse to determine if an original phase error between the incoming data pulse and the clock pulse exists. Similarly, the jitter detection circuit detect subsequent phase errors between subsequent data pulses and subsequent clock pulses. The original detected phase error will then be compared against subsequently detected phase errors. Based on this comparison of the phase errors, the jitter detection circuit then informs the adaptive equalizer of the degree of phase and amplitude compensation that it needs to provide.

22 Claims, 12 Drawing Sheets

JITTER DETECTION METHOD AND APPARATUS

This is a continuation of application Ser. No. 08/413,186, filed Mar. 30, 1995 now abandoned.

BACKGROUND OF THE INVENTION

1. Field of the Invention

The present invention relates to the field of data communication, and particularly to a jitter detection method and apparatus.

2. Description of the Related Art

Communication networks are commonly used to interconnect a variety of computing devices. These networks typically include a number of communication nodes that transmit data from their encoders to their decoders across a variety of transmission media. For example, a number of communication protocols (such as the Ethernet protocol and the Token Ring protocol) utilize twisted pair cables (such as category three unshielded twisted pair cables (UTDCAT3)) to transmit data from their encoder to their decoder.

Transmission of data across transmission media causes the phase and amplitude of the data to be distorted. Amplitude and phase distortions in turn can cause decoders to erroneously predict the value of the received data. For example, phase distortions can cause correlated jitters (i.e., can cause phase-related abrupt spurious variations in the phase of successive received data symbol pulses with respect to the phase of a continuous reference clock), which reduce the probability that demodulators of the decoders will accurately predict the value of the received data by preventing the demodulators from sampling the received signals at the center of the data symbol pulses.

Numerous prior art equalizers have been developed to compensate for phase and amplitude degradations of the transmitted data. For example, prior art equalizers include analog discrete equalizers and digital equalizers (such as automatic line build-out, finite impulse response (FIR), and infinite impulse response (IIR) equalizers). In addition, a number of these prior art equalizers adjust their equalization adaptively. In other words, a number of these equalizers increase their phase and amplitude compensation as the phase and amplitude distortions of the transmitted data increases. One example of an equalizer that adaptively adjusts its phase and amplitude compensation is disclosed in the U.S. Patent Application Ser. No. 08/414,618, filed Mar. 31, 1995, entitled "A Quasi-Adaptive Analog Equalization Method And Apparatus," now U.S. Pat. No. 5,717,716.

Furthermore, in order to ascertain when additional phase and amplitude compensation is needed to oppose the increasing phase and amplitude distortions, some adaptive equalization schemes (such as the equalization scheme disclosed by the above-noted patent application) utilize jitter detection circuits for determining when phase distortions exceed predetermined maximum values. Consequently, there is a need for an innovative jitter detection method and apparatus for detecting when the correlated jitter of the transmitted data exceeds a maximum tolerable value in order to inform an adaptive equalizer to adjust its phase and amplitude compensation.

SUMMARY OF THE INVENTION

The present invention provides a jitter detection method and apparatus for informing an adaptive equalizer that the correlated jitter of transmitted data exceeds a predetermined jitter value. In one embodiment of the present invention, a jitter detection circuit receives transmitted data symbol pulses and clock signal pulses. The jitter detection circuit then compares a specified edge (e.g., the falling edge) of an incoming data pulse with the corresponding specified edge (e.g., the falling edge) of a clock signal pulse to determine if an original phase error between the incoming data pulse and the clock pulse exists. Similarly, the jitter detection circuit detects subsequent phase errors between subsequent data pulses and subsequent clock pulses. The jitter detection circuit then compares the original phase error against the subsequently detected phase errors. Based on this comparison of the phase errors, the jitter detection circuit then informs the adaptive equalizer of the degree of phase and amplitude compensation that it needs to provide.

In another embodiment of the present invention, the jitter detection circuit first measures a first phase error (e.g., measures a first phase lead or a first phase lag) between a specified edge (e.g., the rising edge) of a first data pulse and the corresponding specified edge (e.g., the rising edge) of a clock signal pulse. The jitter detection circuit then measures a second phase error (e.g., measures a second phase lead or a second phase lag) between the specified edge of the next data pulse (i.e., the data pulse that immediately follows the first data pulse) and the specified edge of another clock signal pulse. Finally, the jitter detection circuit informs the adaptive equalizer that additional phase and amplitude compensation is necessary if the difference between the first and second phase errors exceeds a predetermined jitter value.

In one embodiment of the present invention, the jitter detection circuit compares the first phase error and the second phase error by charging an output node. More specifically, in one embodiment of the present invention, during the duration of the first phase error, the jitter detection circuit charges the output node in a first direction if the phase error has a first sign and charges the output node in a second direction if the phase error has a second sign. In addition, for the duration of the second phase error, the jitter detection circuit charges the output node in the second direction if the second phase error has the first sign and charges the output node in the first direction if the second phase error has the second sign. The jitter detection circuit then compares the potential at the output node against a maximum and a minimum reference voltage. If the output node potential is greater than the maximum reference value or is less than the minimum reference value, then the jitter detection circuit informs the adaptive equalizer to provide additional phase and amplitude compensation.

BRIEF DESCRIPTION OF THE DRAWINGS

The objects, features, and advantages of the present invention will be apparent from the following detailed description of the invention with reference to the following drawings.

DETAILED DESCRIPTION OF THE INVENTION

The present invention provides a jitter detection method and apparatus for informing an adaptive equalizer that the correlated jitter of transmitted data exceeds a predetermined jitter level. In the following description, numerous details are set forth in order to provide a thorough understanding of the present invention. However, it will be understood by one of ordinary skill in the art that these specific details are not required in order to practice the invention. In other instances, well-known electrical structures and circuits are shown in block diagram form in order not to obscure the present invention with unnecessary detail.

Figure 1:
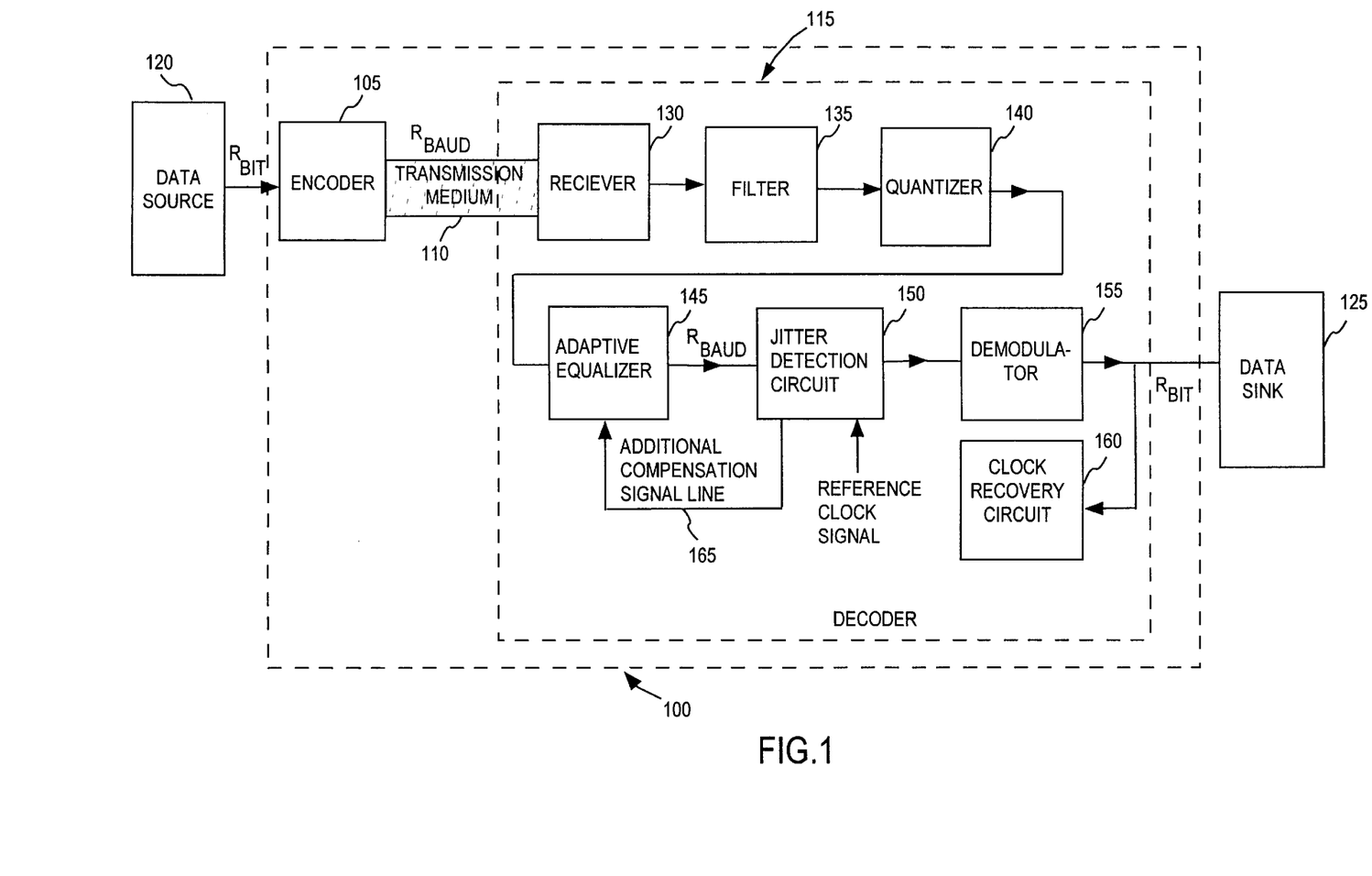
FIG. 1 presents a communication network which includes one embodiment of the jitter detection circuit of the present invention.

FIG. 1 presents a communication network which includes one embodiment of the jitter detection circuit of the present invention. Communication network 100 includes encoder 105, transmission medium 110, and decoder 115 for coupling data source 120 to data sink 125. Data source 120 supplies a data bit stream to encoder 105 at a transmission bit rate $R_{BIT}$. Encoder 105 in turn encodes the bit stream into a plurality of data symbol pulses having a symbol transmission rate $R_{BAUD}$. Encoder 105 then uses transmission medium 110 to transmit the modulated data symbol pulses to receiver 130 of decoder 115 at the symbol transmission rate $R_{BAUD}$.

Receiver 130 then supplies the received sequence of symbols to filter 135, which filters out the out-of-bandwidth noise that was picked up during the transmission of the symbols. In turn, filter 135 supplies the sequence of received symbols to quantizer 140. This quantizer which samples the symbols at a sampling frequency equal to or greater than the Nyquist sampling frequency, which is twice the frequency of the maximum frequency component of the transmitted data. Quantizer 140 in turn supplies the sampled symbols to adaptive equalizer 145, which compensates for amplitude and phase distortions due to transmission. More specifically, equalizer 145 compensates for amplitude attenuation and group delay of the higher frequency components of the incoming symbols. Since equalizer 145 is adaptive, it is coupled to jitter detection circuit 150 in order to ascertain when it needs to adjust (e.g., increase) its phase and amplitude compensation to counteract the phase and amplitude distortions in the transmitted data.

Thus, equalizer 145 supplies to jitter detection circuit 150 the equalized data symbols. In order to inform adaptive equalizer 145 to adjust its phase and amplitude compensation, jitter detection circuit 150 also receives a reference clock, which it uses for detecting the amount of correlated jitter in the data. The jitter detection circuit then compares this amount of correlated jitter against predetermined jitter values. For example, in one embodiment of the present invention, jitter detection circuit 150 compares a specified edge (e.g., the falling edge) of the incoming data pulses with the corresponding specified edge (e.g., the falling edge) of reference clock pulses to detect if the correlated jitter of the data pulses exceeds a predetermined value. If jitter detection circuit 150 detects an excessive amount of jitter, it then informs adaptive equalizer 145 to increase its phase and amplitude compensation.

More specifically, in one embodiment of the present invention, jitter detection circuit 150 compares a specified edge (e.g., the falling edge) of an incoming data pulse with the corresponding specified edge (e.g., the falling edge) of a reference clock pulse to determine if an original phase error exists between the incoming data pulse and the clock pulse. Jitter detection circuit 150 then similarly detects subsequent phase errors between subsequent incoming data pulses and subsequent reference clock pulses. Jitter detection circuit 150 then compares the originally detected phase error against the subsequently detected phase errors. Based on this comparison of the phase errors, the jitter detection circuit then determines if the correlated jitter of the data symbol pulses exceeds one of a predetermined set of jitter values, in order to inform the adaptive equalizer of the degree of phase and amplitude compensation that it needs to provide.

In another embodiment of the present invention, jitter detection circuit 150 uses recovered clock signals (i.e., clock signals that clock recovery circuit 160 derives from the received data symbols) as the clock reference to compare against the data pulses, because recovered clock signals cannot change instantaneously in response to jitter. Thus, in one embodiment of the present invention, jitter detection circuit 150 first measures a first phase error (e.g., measures a first phase lead or a first phase lag) between a specified edge (e.g., the rising edge) of a first data pulse and the corresponding specified edge (e.g., the rising edge) of a first recovered clock signal pulse. Jitter detection circuit 150 then measures a second phase error (e.g., measures a second phase lead or a second phase lag) between the specified edge (e.g., the rising edge) of a second data pulse that immediately follows the first data pulse and the corresponding specified edge (e.g., the rising edge) of a second recovered clock signal pulse. Finally, if the difference between the first and second phase errors exceeds a predetermined jitter value, jitter detection circuit 150 transmits an additional compensation signal on line 165 to adaptive equalizer 145, in order to cause the equalizer to provide additional phase and amplitude compensation. Several additional detailed embodiments of the present invention's jitter detection circuit will be discussed below by reference to FIGS. 2 and 3.

Jitter detection circuit 150 then supplies the equalized data symbol pulses to demodulator 155 for converting the data symbol pulses into data bit pulses. More specifically, demodulator 155 (1) samples the incoming symbols at a clock rate determined by clock recovery circuit 160, which uses a well know prior art clock recovery scheme (such as a phase locked loop clock recovery scheme or a digital delay line clock recovery scheme) to generate a recovered clock (whose frequency is typically twice the frequency of the highest frequency component of the data), and (2) compares these samples to predetermined levels in order to demodulate the incoming symbol pulses into bit pulses. Finally, decoder 115 supplies the demodulated bit stream to data sink 125 at the bit transmission rate RBIT.

Figure 2:
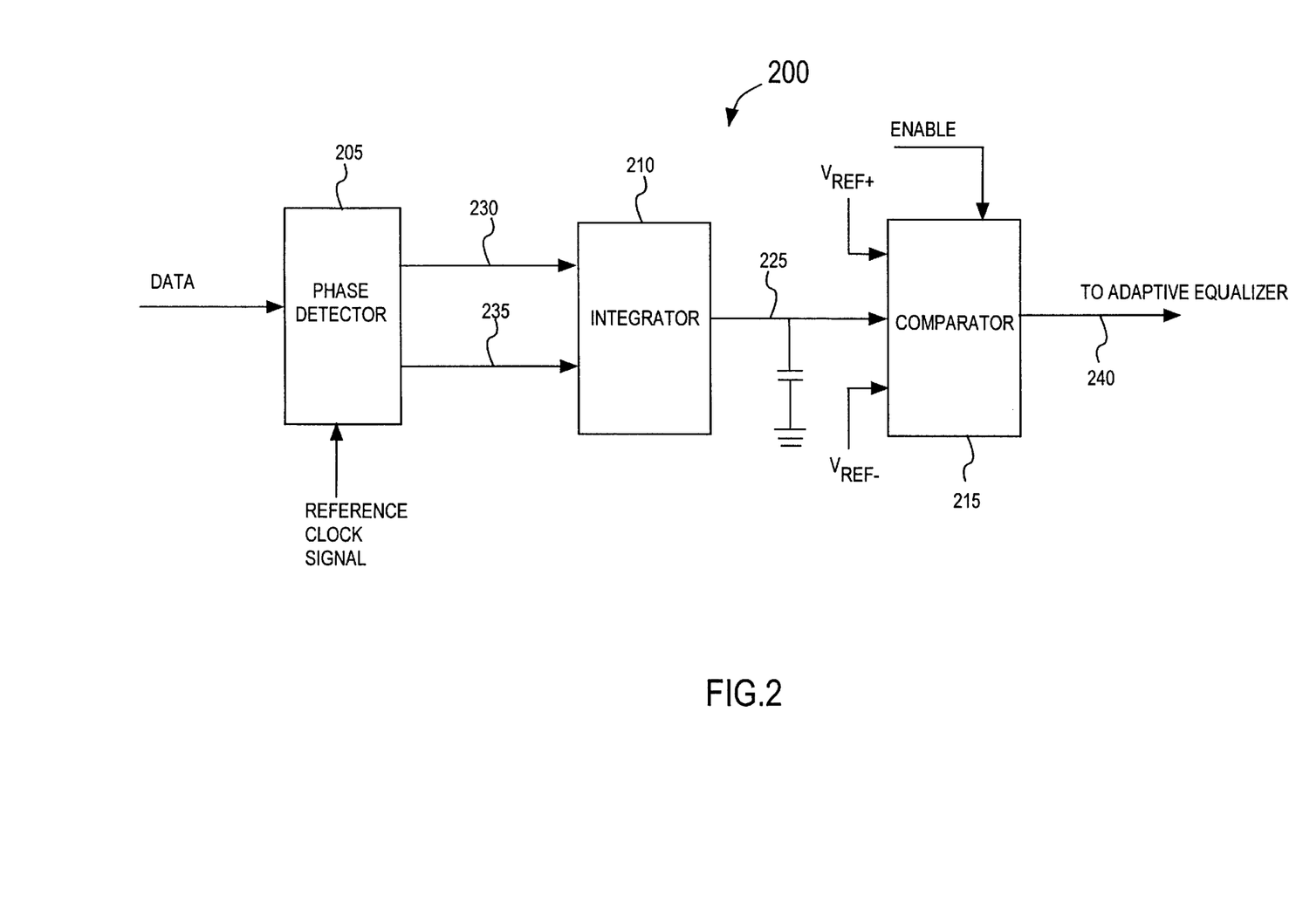
FIG. 2 presents another embodiment of the jitter detection circuit of the present invention.

FIG. 2 presents another embodiment of the jitter detection circuit of the present invention. Like jitter detection circuit 150, jitter detection circuit 200 is used in a data communication network (such as communication network 100 of FIG. 1) to inform an adaptive equalizer to adjust its phase and amplitude compensation when the amount of correlated jitter in the received data exceeds predetermined jitter values. As shown in this figure, jitter detection circuit 200 includes phase detector 205, integrator 210, and comparator 215.

Phase detector 205 receives transmitted data pulses and reference clock pulses in order to compare a specified edge (e.g., the falling edge) of the incoming data pulses with the corresponding specified edge (e.g., the falling edge) of reference clock pulses. In one embodiment of the present invention, because the recovered clock signals cannot change spontaneously in response to jitter, phase detector 205 uses a recovered clock (i.e., a clock that a clock recovery circuit derives from the received data symbols) as the clock reference to compare against the data pulses. Thus, in this embodiment of the present invention, jitter detection circuit 200 uses phase detector 205 (1) to determine if there is a phase error between an incoming data pulse and a recovered clock pulse, and if so (2) to determine if the phase error has a positive sign (e.g., if the data pulse leads the clock pulse) or if the phase error has a negative sign (e.g., if the data pulse lags the clock pulse).

More specifically, one embodiment of phase detector 205 first measures the duration of a first phase error (e.g., measures the duration of a first phase lead or a first phase lag) between a specified edge (e.g., the rising edge) of a first data pulse and the corresponding specified edge (e.g., the rising edge) of a first clock pulse. Based on the sign of the first phase error, phase detector 205 then causes integrator 210 to charge output node 225 (which has an original no-jitter voltage value) in one of two predetermined directions (e.g., to charge its output node towards the positive power supply voltage or the negative power supply voltage), by supplying one of two enable signals to integrator 210 for the duration of the first phase error. For instance, if the first phase error has a positive sign (e.g., if the first data pulse leads the first clock pulse), phase detector 205 supplies to integrator 210 a first phase error pulse (whose duration corresponds to the difference between the first data pulse and the first clock pulse) on first enable signal line 230 to cause integrator 210 to charge its output in a first direction (e.g., to charge output node 225 towards the positive power supply voltage). On the other hand, if the first phase error has a negative sign (e.g., if the first data pulse lags the first clock pulse), phase detector 205 supplies to integrator 210 the first phase error pulse on second enable signal line 235 in order to cause integrator 210 to charge its output in a second direction (e.g., to charge its output node towards the negative power supply voltage).

Phase detector 205 then measures the duration of a second phase error (e.g., measures the duration of a second phase lead or a second phase lag) between the specified edge (e.g., the rising edge) of a second data pulse that immediately follows the first data pulse and the corresponding specified edge (e.g., the rising edge) of a second clock pulse. Based on the sign of the second phase error, phase detector 205 then causes integrator 210 to charge its output in one of the two predetermined directions (e.g., to charge output node 225 towards the positive power supply voltage or the negative power supply voltage), by supplying one of the two enable signals to integrator 210 for the duration of the second phase error. For instance, if the second phase error has a positive sign (e.g., if the second data pulse leads the second clock pulse), phase detector 205 supplies to integrator 210 a second phase error pulse (whose duration corresponds to the difference between the second data pulse and the second clock pulse) on second enable signal line 235 to cause integrator 210 to charge its output in a second direction (e.g., to charge output node 225 towards the negative power supply voltage). On the other hand, if the second phase error has a negative sign (e.g., if the second data pulse lags the second clock pulse), phase detector 205 supplies to integrator 210 the second phase error pulse on first enable signal line 230 in order to cause integrator 210 to charge its output in a first direction (e.g., to charge its output node towards the positive power supply voltage).

After integrating the first and second phase errors, comparator 215 is enabled (i.e., is provided with an enable signal from either phase detector 205, integrator 210, or some external control logic block), in order to compare the potential at output node 225 against a maximum reference voltage and a minimum reference voltage. If the potential at output node 225 is greater than the maximum reference value or is less than the minimum reference value, then comparator 215 outputs a compensation signal on bus 240, which informs the adaptive equalizer to provide additional phase and amplitude compensation. In alternative embodiments of jitter detection circuit 200, comparator 215 receives several additional reference voltage values, in order to compare the potential at output node 225 against a variety of reference voltage values. Based on these numerous comparisons, comparator 215 then can cause the adaptive equalizer to provide a particular amount of compensation from a range of compensation values, by supplying to the adaptive equalizer the identifying compensation signals on bus 240. Finally, after comparator 215 performs its comparison, integrator 210 resets the voltage at output node 225 to the original no-jitter voltage value.

Figure 3A:
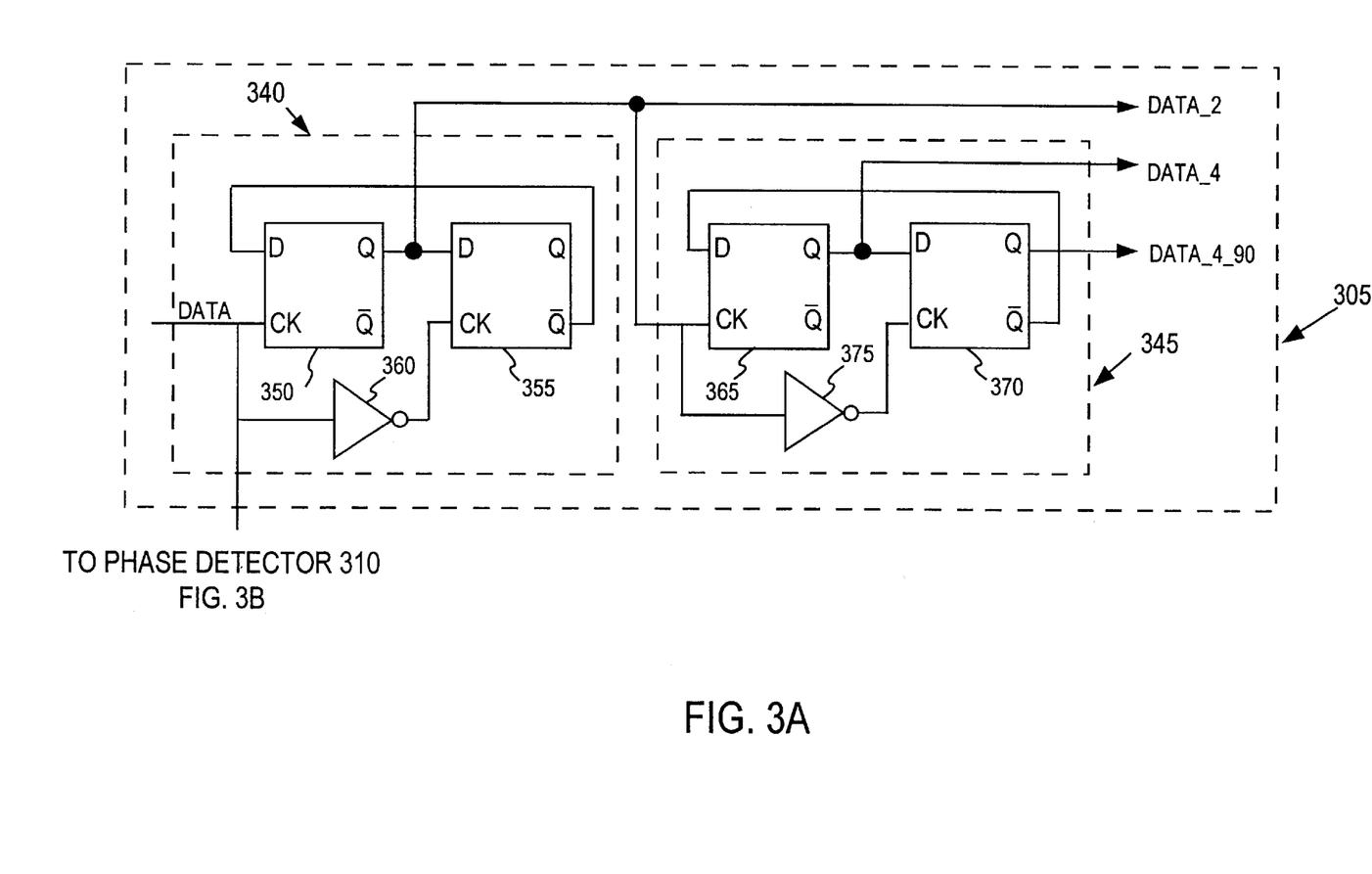
FIG. 3 presents yet another embodiment of the jitter detection circuit of the present invention.
Figure 3B:
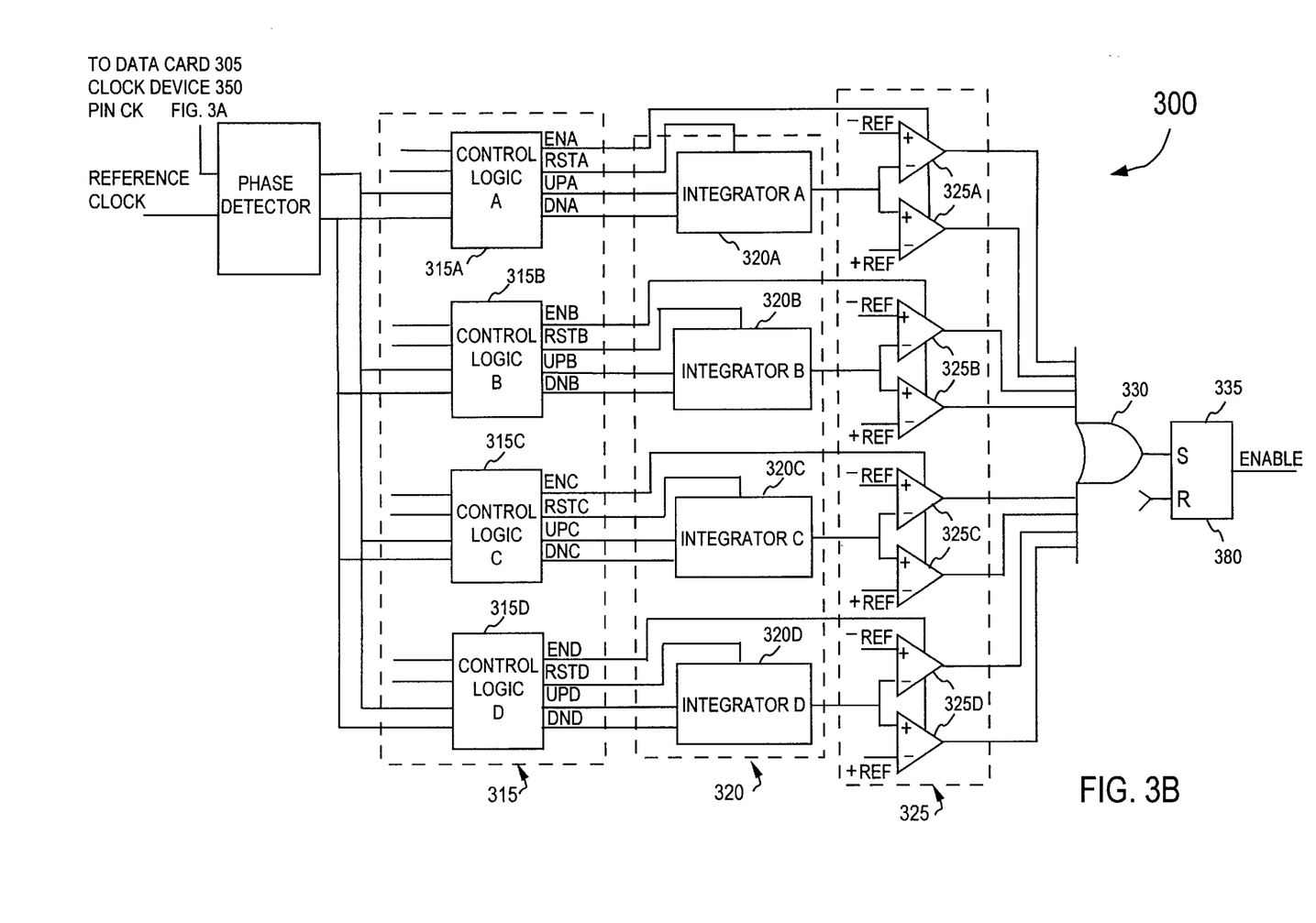

FIG. 3 presents another embodiment of the present invention's jitter detection circuit. Like jitter detection circuit 150, jitter detection circuit 300 is used in a data communication network (such as communication network 100 of FIG. 1) to inform an adaptive equalizer to adjust its phase and amplitude compensation when the amount of correlated jitter and the received data exceeds predetermined jitter values. As shown in this figure, jitter detection circuit 300 includes control signal generator 305, phase detector 310, control logic circuits 315, integrators 320, comparators 325, OR gate 330, and latch 335.

Figure 4:
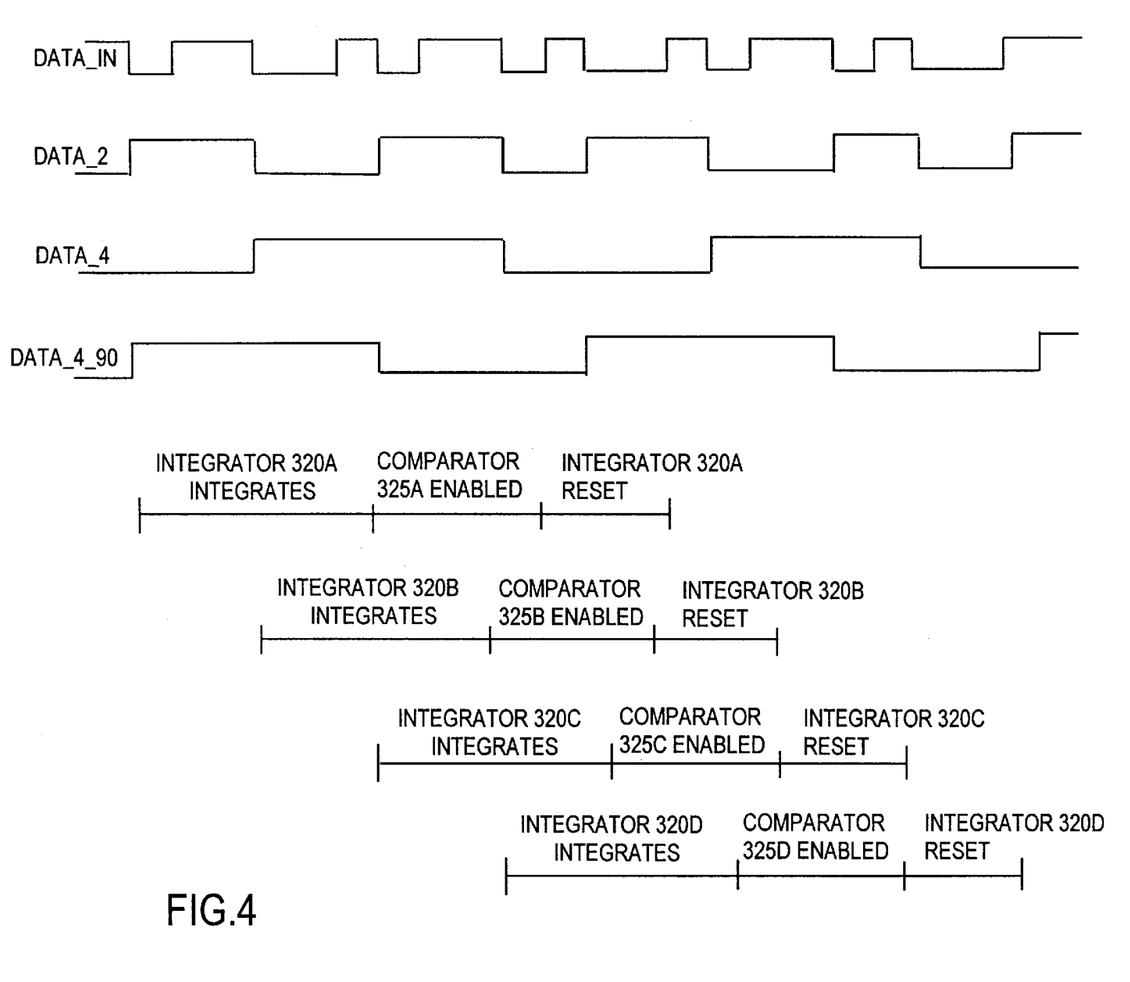
FIG. 4 presents the timing diagrams for control signals which are generated by a control signal generator of jitter detection circuit of FIG. 3 and which are used to interleave jitter detection operations that are performed on four subsequent data pulses.

Control signal generator 305 uses the received data pulses to generate three control signals (Data_2, Data_4, and Data_4_90, whose timing diagram is provided in FIG. 4) that control the operation of control logic circuits 315. Control signal generator 305 includes two divide-by-two circuits 340 and 345 which generate the three control signals from the received data signals. Flip-flops 350 and 355 and inverter 360 form divide-by-two circuit 340, which generates the Data_2 signal. Flip-flops 365 and 370 and inverter 375 form divide-by-two circuit 345, which receives the Data_2 control signal in order to generate Data_4 control signal and Data_4_90 control signal (which is a 90 degree out of phase version of the Data_4 control signal). As further elaborated below, control logic circuits 315 then utilizes these three control signals to interleave four jitter detection operations that are performed on four subsequent data pulses. The interleaving of the four jitter operations enables a particular phase error that is detected at the rising edge of a particular data pulse to be compared against the previous and latter phase errors (e.g., against the phase errors that immediately preceded and proceeded the particular phase error).

Phase detector 500 receives the received data symbol pulses and the recovered clock pulses to generate output phase error pulses that indicate whether the data pulses lead or lag behind the clock pulses. Control logic circuits 315 then receive these phase error pulses in order to determine whether to cause integrators 320 to integrate toward the positive or the negative power supply voltages. As mentioned before, control logic circuits 315 also receive the phase generated control signals (Data_2, Data_4, and Data_4_90 control signals), which enable control logic circuits 315 to interleave four jitter detection operations that are performed on four subsequent data pulses. The combinational logic equations of control logic 315 are as follows:

control logic circuit 315A to force the integrator to integrate down. The results of these integrations are then compared against the positive and negative references.

Furthermore, when a first incoming data pulse leads a first clock pulse while a second incoming data pulse lags a second clock pulse, phase detector 310 produces a lead pulse and a lag pulse. Both the lead and the lag pulses cause control logic 315 to force the integrator to integrate up. Comparators 325A then compare the integration results against the positive and negative references. Finally, when a first incoming data pulse lags a first clock pulse while a second incoming data pulse leads a second clock pulse, phased detector 310 produces a lag pulse and a lead pulse. Both the lag and the lead pulses cause control logic 315 to force the integrator to integrate down. Comparators 325A

```
ENA = NOT DATA_4_90 AND DATA_2
RSTA = NOT DATA_4_90 AND NOT DATA_2
UPA = [(LEAD AND DATA_2) OR (LAG AND NOT DATA_2)] AND DATA_4_90
DNA = [(LAG AND DATA_2) OR (LEAD AND NOT DATA_2)] AND DATA_4_90
ENB = NOT DATA_4 AND NOT DATA_2
RSTB = NOT DATA_4 AND DATA_2
UPB = [(LEAD AND NOT DATA_2) OR (LAG AND DATA_2)] AND DATA_4
DNB = [(LAG AND NOT DATA_2) OR (LEAD AND DATA_2)] AND DATA_4
ENC = DATA_4_90 AND DATA_2
RSTC = DATA_4_90 AND NOT DATA_2
UPC = [(LEAD AND DATA_2) OR (LAG AND NOT DATA_2)] AND NOT DATA_4_90
DNC = [(LAG AND DATA_2) OR (LEAD AND NOT DATA_2)] AND NOT DATA_4_90
END = DATA_4 AND NOT DATA_2
RSTD = DATA_4 AND DATA_2
UPD = [(LEAD AND NOT DATA_2) OR (LAG AND DATA_2)] AND NOT DATA_4
DND = [(LAG AND NOT DATA_2) OR (LEAD AND DATA_2)] AND NOT DATA_4
```

The enable signals (EN) enable comparators 325 which compare the integration results against the maximum and minimum reference voltage values. The reset signals (RST) clear the integration results from the integrators. The integrate up signal (UP) and integrate down signal (DN) respectively cause integrators 320 to integrate towards the positive and negative power supplies. Therefore, if any of the outputs from the integrators are sufficiently high or low, then (via OR gate 330 and latch 335) one or more of the outputs of comparators 325 will cause the adaptive equalizer to receive an additional compensation signal on bus 380. This additional compensation signal in turn causes the adaptive equalizer to provide additional phase and amplitude compensation. In one embodiment of the present invention, the maximum and minimum reference voltage values supplied to comparators 325 are selected so that a maximum jitter of 2.5 nanoseconds causes jitter detection circuit 300 to provide an additional compensation signal to the adaptive equalizer.

The operation of jitter detection circuit 300 will now be described by reference to the following illustrative examples pertaining to the operation of phase detector 310, control logic circuit 315A, integrator 320A, and comparators 325A. For example, when two successive data pulses lag behind the recovered clock, successive lag pulses are generated by phase detector 310. The first lag pulse in turn causes control logic circuit 315A to force integrator 320A to integrate down, while the second lag pulse causes control logic circuit 315A to force integrator 320A to integrate up. Comparators 325 then compare the integration results against the positive and negative reference values. On the other hand, when two successive data pulses lead the recovered clock, phase detector 310 produces two successive lead pulses. The first lead pulse causes control logic circuit 315A to force integrator 320A to integrate up, while the second pulse causes then compare the integration results against the positive and negative references.

Figure 5:
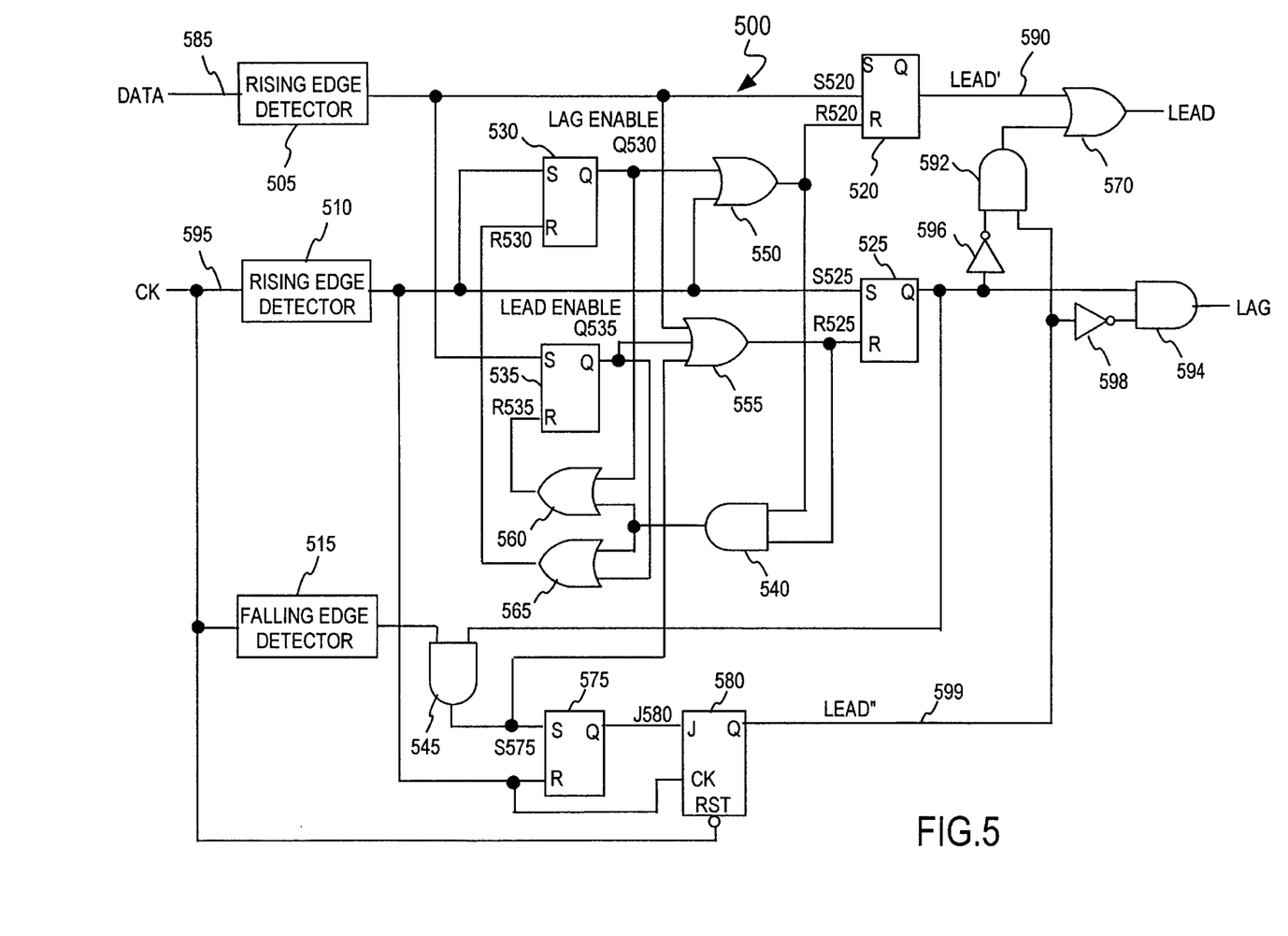
FIG. 5 presents one embodiment of a phase detector used in the jitter detection circuit of FIG. 3.

FIG. 5 presents one embodiment of phase detector 310 of FIG. 3. Phase detector 500 of FIG. 5 includes three edge detectors 505, 510, and 515, six flip flops 520, 525, 530, 535, 575, and 580, four AND gates 540, 545, 592, and 594, five OR gates 550, 555, 560, 565, and 570, and two inverters 596 and 598. Rising edge detectors 505 and 510 generate rising edge detected pulses when they detect low to high transitions on their input lines. These rising edge detected pulses in turn cause flip flops 520 and 525 to generate lead and lag pulses.

Figure 6:
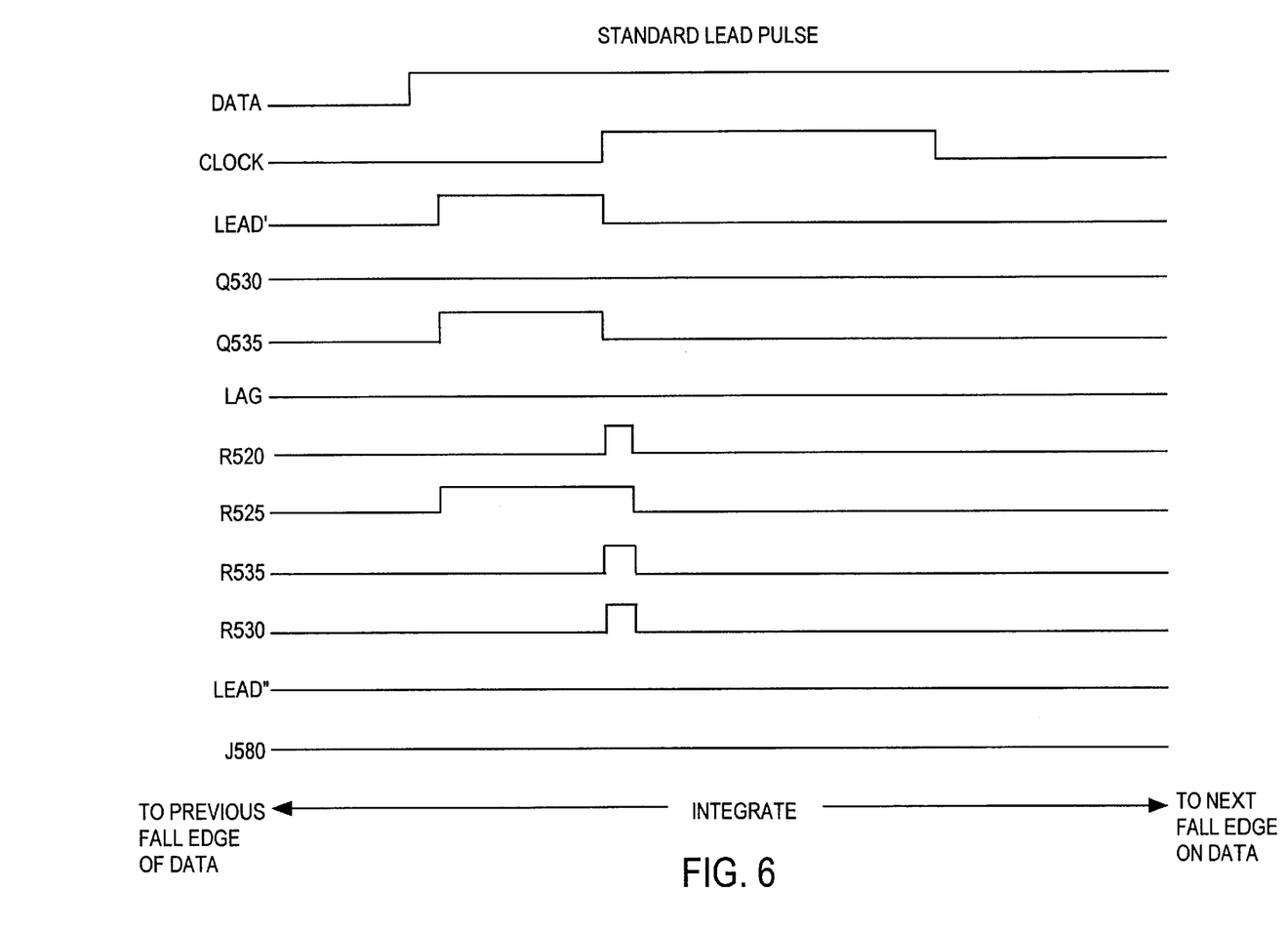
FIG. 6 presents timing diagrams that describe the operation of the phase detector of FIG. 5 when a data pulse leads a clock pulse.

More specifically, FIG. 6 presents the operation of phase detector 500 when a data pulse leads the recovered clock. As shown in this figure, when a data pulse leads the recovered clock, rising data edge detector 505 initially detects a low to high transition on data line 585. In response to this transition, edge detector 505 generates a rising data edge pulse, which (1) causes flip flop 520 to force the signal on lead' line 590 high, and (2) causes flip flop 535 to supply a lead enable signal to flip flop 525. This lead enable signal in turn holds flip flop 525 in reset until the rising edge of the clock signal. At the rising edge of the clock signal, rising edge detector 510 generates a rising clock edge pulse, which causes flip flops 520, 525, 530, 535, and 575 to reset. In turn, the resetting of flip flop 520 causes this flip flop to complete the generation of the lead pulse by forcing the signal on its lead' line 590 low. Finally, it should be noted that phase detector 500 does not need circuitry for ensuring that the lead enable signal is deactive upon the falling edge of the data pulse because, as the frequency of the clock is at least twice the maximum frequency of the data, phase detector 500 always receives the rising edge of the clock prior to the falling edge of the data.

Figure 7:
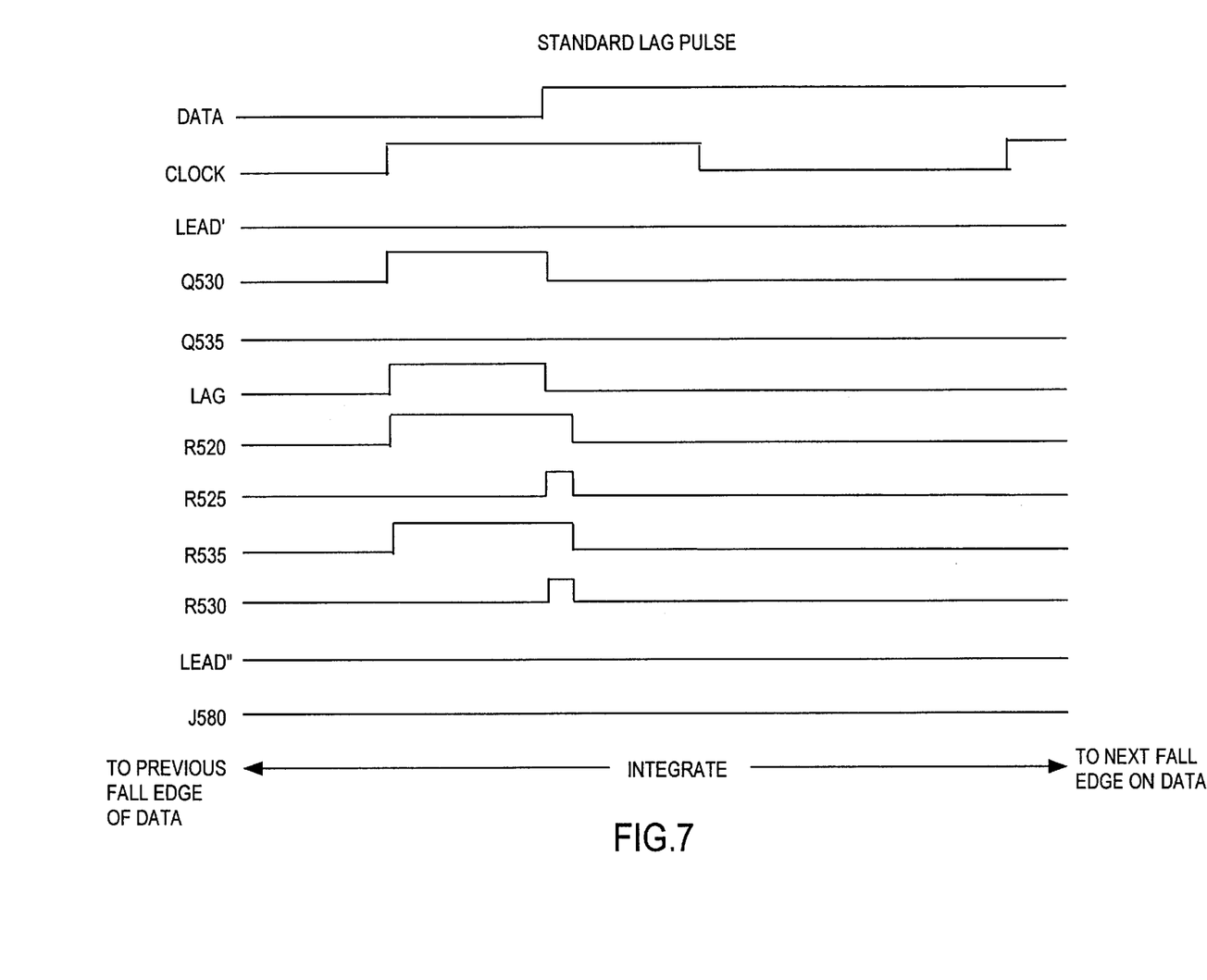
FIG. 7 presents timing diagrams that describe the operation of the phase detector of FIG. 5 when a data pulse lags a clock pulse.

FIG. 7 sets forth the operation of phase detector 500 when a data pulse lags the recovered clock. When a data pulse lags the recovered clock, rising clock edge detector 510 initially detects a low to high transition on its clock input line 595. In response to this transition, edge detector 510 generates a rising clock edge pulse, which (1) causes flip flop 525 to force the signal on the lag line high, and (2) causes flip flop 530 to supply a lag enable signal to flip flop 520. This lag enable signal in turn holds flip flop 520 in reset until either the falling edge of the clock pulse or the rising edge of a data pulse that it receives before the falling edge of the clock pulse. If phase detector 500 receives a data pulse before the falling edge of the clock pulse, rising data edge detector 505 generates a rising data edge pulse when it detects a low to high transition on data line 585. This rising data edge pulse then causes flip flop 520, 525, 530, and 535 to reset. The resetting of flip flop 525 causes this flip flop to complete the generation of the lag pulse by forcing the signal on the lag line low.

Figure 8:
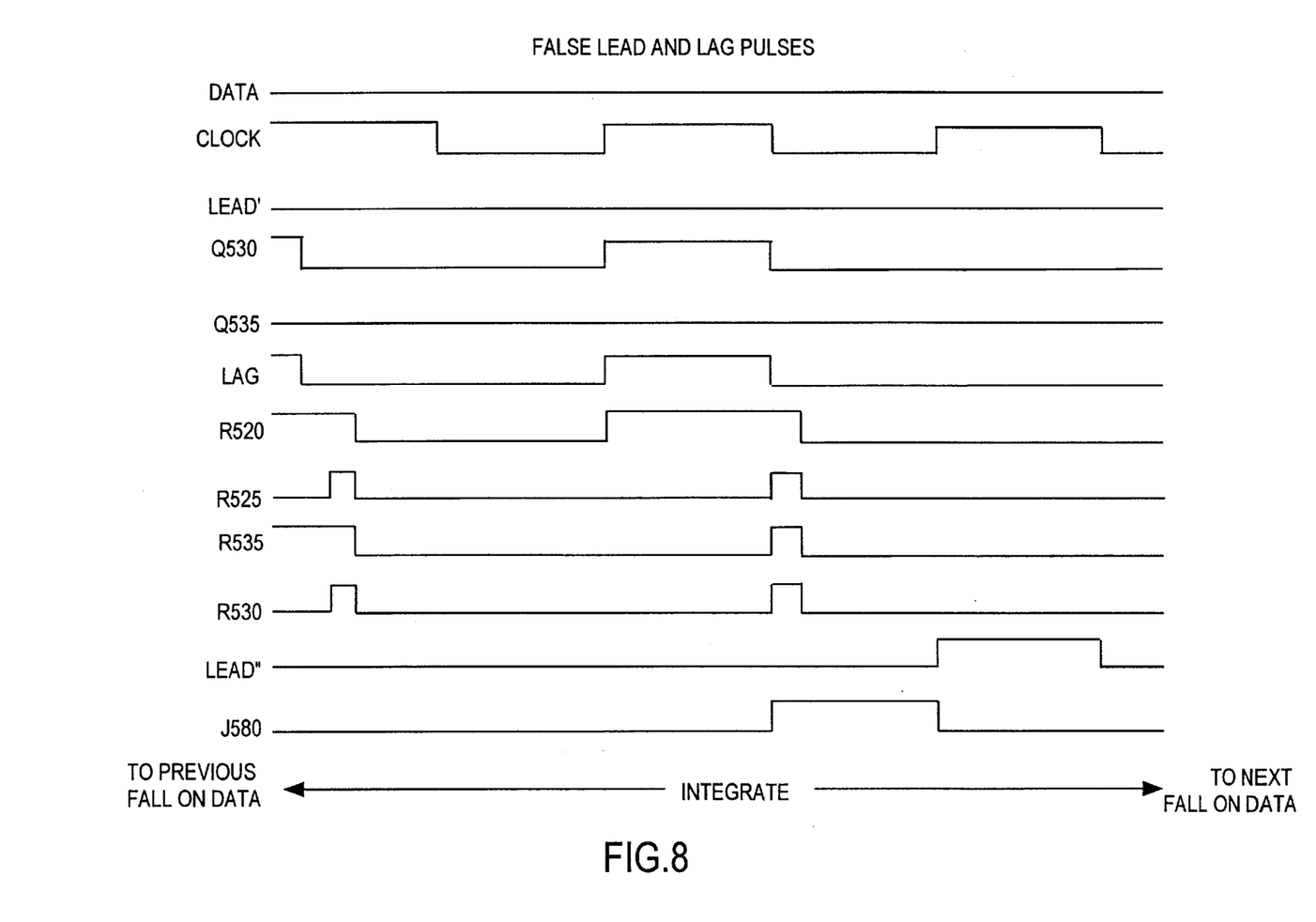
FIG. 8 presents the timing diagrams that describe the operation of the phase detector of FIG. 5 when no data pulse is received for the duration of a clock pulse.

As shown in FIG. 8, if phase detector 500 does not receive a data pulse before the falling edge of the clock pulse (i.e., if phase detector 500 does not receive a data pulse for the duration of the clock pulse), falling edge detector 515, AND gate 545, and flip flop 525 complete the generation of a false lag pulse by forcing the signal on the lag line low at the falling edge of the clock pulse. However, in order to cancel the effects of this false lag pulse, flip flops 570 and 575 generate a false lead pulse on lead" line 599. Furthermore, in order to prevent phase detector 500 from simultaneously outputting a lag pulse and a false lead pulse, AND gates 592 and 594 and inverters 596 and 598 cause the false lead pulse (on lead" line 599) and the lag pulse generated while the false lead pulse is active to cancel each other.

Figure 9:
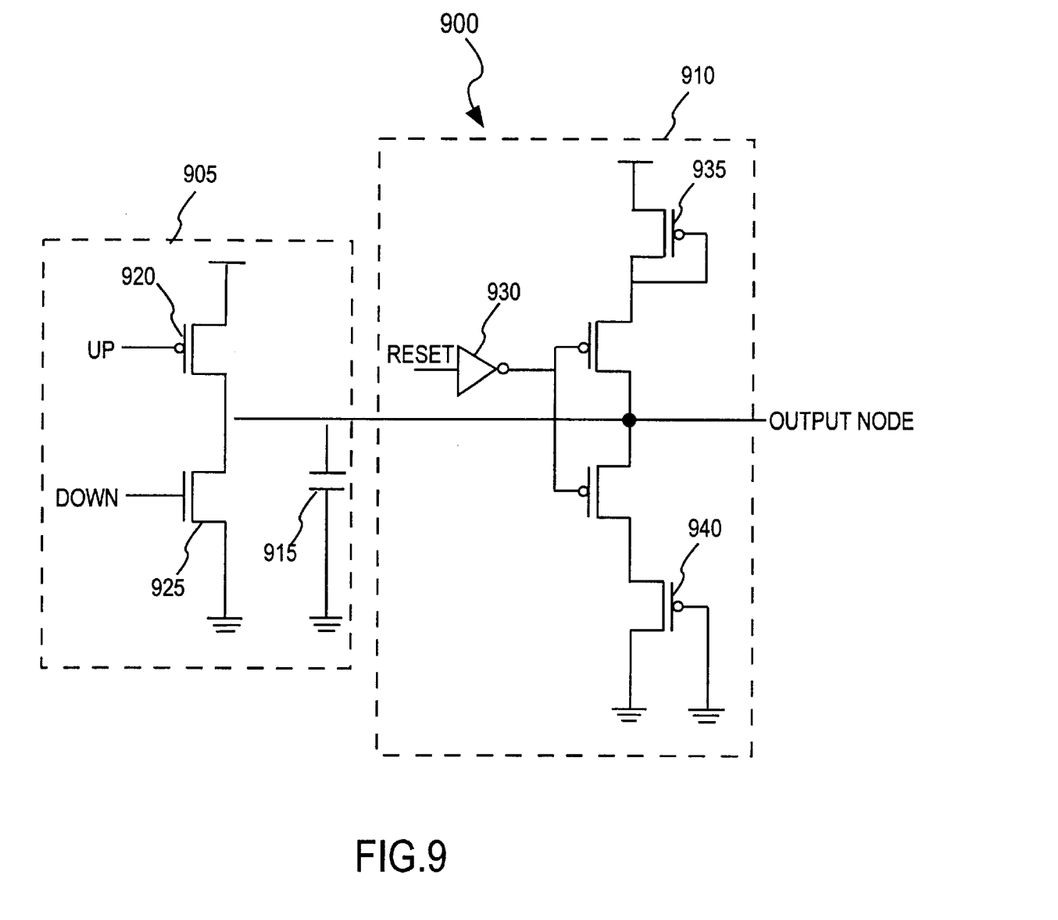
FIG. 9 presents one embodiment of an integrator of the jitter detection circuit of FIG. 3.

FIG. 9 presents one embodiment of an integrator which can be used as any one of the integrators 320 of FIG. 3. As shown in FIG. 9, integrator 900 includes an integration section 905, and a resetting section 910. Integration section 905 includes (1) capacitor 915 for charging the integrator's output node in one of two directions, (2) PMOS transistor 920 for charging the output capacitor towards the positive power supply voltage in response to an UP pulse, and (3) NMOS transistor 925 for charging capacitor 915 towards the negative power supply in response to a DOWN pulse. Furthermore, resetting section 910 uses inverter 930 and saturated transistors 935 and 940 to reset its output node to its original no-jitter voltage value in response to a reset signal.

Figure 10:
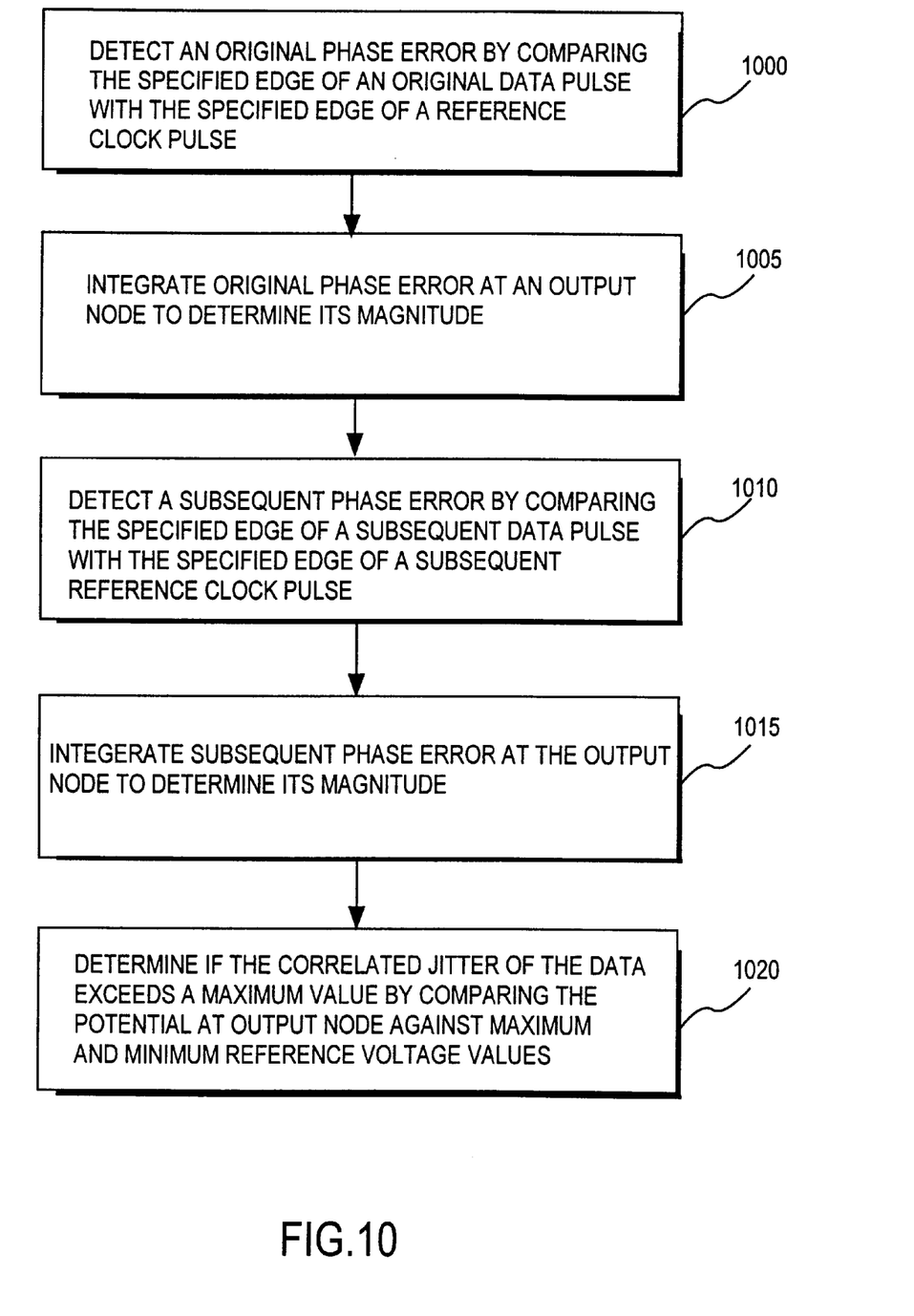
FIG. 10 presents a flow diagram for one embodiment of the jitter detection method of the present invention.

FIG. 10 presents one embodiment of the present invention's jitter detection method for providing systematic phase error detection. This jitter detection method is used in a data communication network to inform an adaptive equalizer to adjust its phase and amplitude compensation when the amount of correlated jitter in the received data exceeds predetermine jitter values. As shown in FIG. 10, at step 1000, a phase detector compares a specified edge (e.g., the rising edge) of an original equalized data pulse it receives with the corresponding specified edge (e.g., the rising edge) of a recovered clock pulse, in order to detect an original phase error. At step 1005, this original phase error is integrated at an output node to determine its magnitude.

The phase detector at step 1010 then compares the specified edge (e.g., the rising edge) of a subsequent data pulse with the specified edge (e.g., the rising edge) of a subsequent recovered clock pulse, in order to detect a subsequent phase error. At step 1015, this subsequent phase error is also integrated at the output mode in order to add or subtract the magnitude of the subsequent phase error from the magnitude of the original phase error. This subsequent integration is performed with a sign change, unless the subsequent phase error has an opposite sign to the sign of the original phase error, in which case the negative values cancel and the subsequent integration is performed without a sign change (i.e., the subsequent integration is performed in the same direction as the original phase error integration). At step 1020, the potential at the output node is then compared against maximum and minimum reference voltage values to determine if the sum of the original and the subsequent errors is above or below these specified reference values. If sum of the errors is beyond these specified reference values, then the adaptive equalizer is informed to provide additional phase and amplitude compensation.

Figure 11:
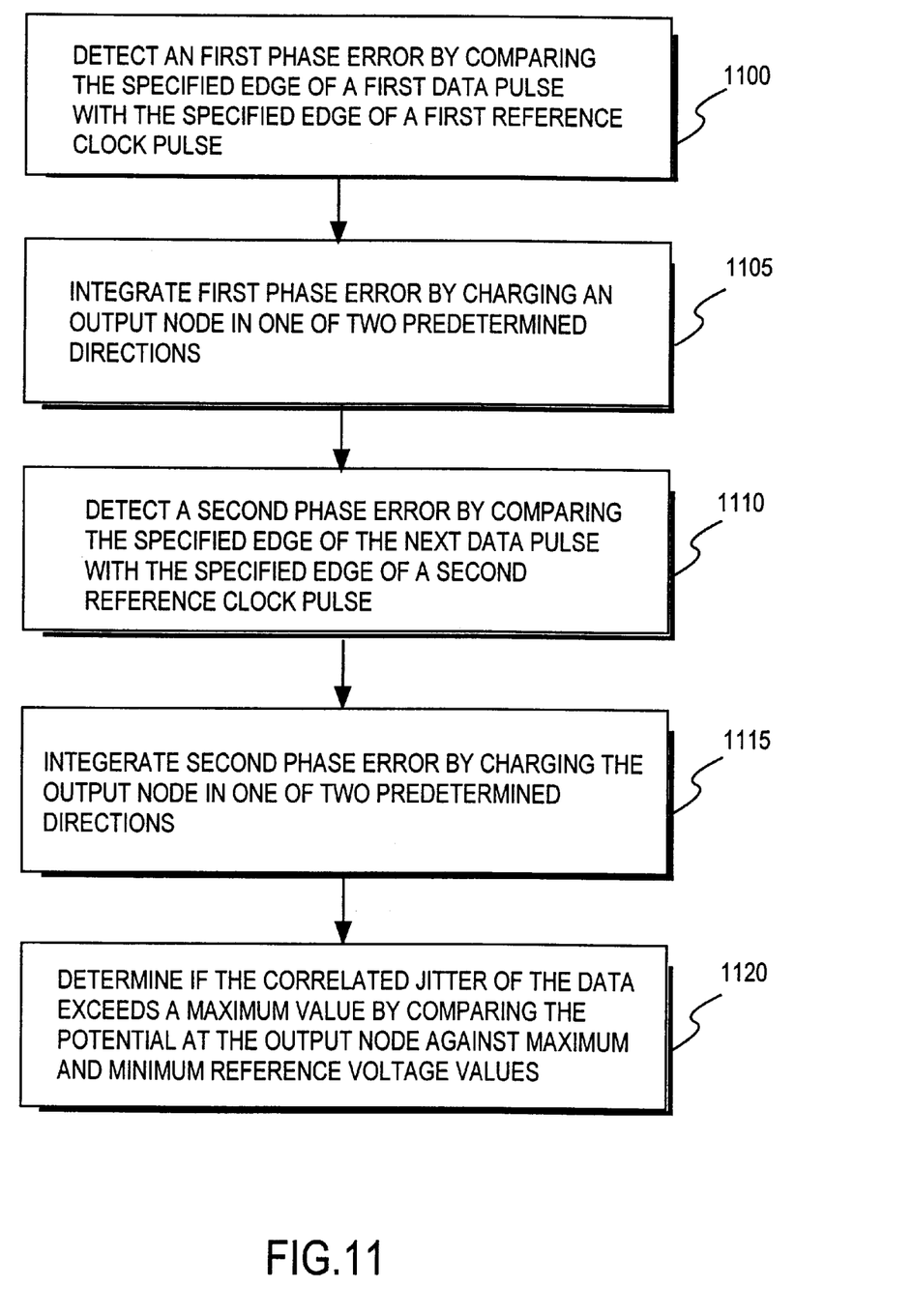
FIG. 11 presents a flow diagram for another embodiment of the jitter detection method of the present invention.

FIG. 11 presents another embodiment of the present invention's jitter detection method for providing a systematic phase error detection. This jitter detection method is used in a data communication network to determine if variations in phase errors between incoming data pulses and reference clock pulses exceed predetermined maximum jitter values. Thus, at step 1100, the phase detector first measures the duration of a first phase error (e.g., measure the duration of a first phase lead or a first phase lag) between a specified edge (e.g., the rising edge) of a first data pulse and the corresponding specific edge (e.g., the rising edge) of a first clock pulse. Based on the sign of the first phase error, the phase detector then at step 1105 causes an integrator to charge an output node in one of two predetermined directions. For instance, if the first phase error has a positive sign (e.g., if the first data pulse leads the first clock pulse), the phase detector causes the integrator to charge its output in a first direction (e.g., to charge the output node towards the positive power supply voltage). On the other hand, if the first phase error has a negative sign (e.g., if the first data pulse lags the first clock pulse), the phase detector causes the integrator to charge the output node in the second direction (e.g., to charge the output node towards the negative power supply voltage).

At step 1110, the phase detector then measures the duration of a second phase error (e.g., measures the duration of a second phase lead or a second phase lag) between the specified edge (e.g., the rising edge) of a second data pulse that immediately follows the first data pulse and the corresponding specified edge (e.g., the rising edge) of a second clock pulse. At step 1115, based on the sign of the second phase error, the phase detector then causes the integrator to charge the output node in one of the two predetermined directions. For example, if the second phase error has a positive sign (e.g., if the second data pulse leads the second clock pulse), the phase detector causes the integrator to charge the output node in a second direction (e.g., to charge the output node towards the negative power supply voltage). On the other hand, if the second phase error has a negative sign (e.g., if the second data pulse lags the second clock pulse), the phase detector causes the integrator to charge the output node in a first direction (e.g., to charge the output node towards the positive power supply voltage).

At step 1120, a comparator then compares the potential at the output node against a maximum reference voltage at a minimum reference voltage. If the potential at the output node is greater than the maximum reference voltage or is less than the minimum reference voltage, then the comparator informs the adaptive equalizer to provide additional phase and amplitude compensation.

One of ordinary skill in the art would recognize that the above-described invention may be embodied in other specific forms without departing from the spirit or the essential characteristics of the disclosure. For instance, in alternative embodiments of the present invention, the present invention's jitter detection apparatus is adapted to operate with a different communication network than one shown in FIG. 1. Furthermore, alternative embodiments of jitter detection circuit 300 of FIG. 3 utilize alternative phase detectors than phase detector 500. Thus, while certain exemplary embodiments have been described and shown in the accompanying drawings, the invention is not to be limited by the foregoing illustrative details but rather is to be defined by the appended claims.

What is claimed is:

1. An apparatus comprising:
   a jitter detection circuit measuring a plurality of phase errors including a first phase error and a second phase error between a selected plurality of data signals and a corresponding plurality of clock signals, wherein the jitter detection circuit provides a jitter compensation signal indicative of whether a correlated jitter corresponding to a difference between the first and second phase errors exceeds a predetermined range.

2. The apparatus of claim 1 further comprising:
   an adaptive equalizer coupled to provide the plurality of data signals to the jitter detection circuit, the adaptive equalizer adjusting at least one of a phase compensation and an amplitude compensation for the data signals in accordance with the jitter compensation signal.

3. The apparatus of claim 2 wherein no adjusting is performed if the jitter compensation signal indicates that the correlated jitter is within an acceptable range.

4. An apparatus comprising:
   a phase detector providing a first signal corresponding to an original phase error between a first data signal and a first clock signal, wherein the phase detector provides a second signal corresponding to a subsequent phase error between a second data signal and a second clock signal;
   an integrator coupled to receive the first and second signals, the integrator providing a correlated jitter signal corresponding to a difference between the original and subsequent phase errors; and
   a comparator coupled to provide a jitter compensation signal indicative of whether the correlated jitter signal exceeds a predetermined range.

5. The apparatus of claim 4 wherein the original phase error is measured between a specified edge of the first data signal and a specified edge of the first clock signal, wherein the subsequent phase error is measured between a specified edge of the second data signal and a specified edge of the second clock signal.

6. An apparatus comprising:
   detection means to detect a first phase error between a first clock pulse and a first data pulse, the detection means detecting a second phase error between a second clock pulse and a second data pulse; and
   comparison means providing a jitter compensation signal to indicate if a correlated jitter corresponding to a difference between the first and second phase errors exceeds a predetermined value.

7. The apparatus of claim 6 wherein the first phase error is measured between a specified edge of the first data pulse and a specified edge of the first clock pulse, wherein the second phase error is measured between a specified edge of the second data pulse and a specified edge of the second clock pulse.

8. The apparatus of claim 6 further comprising:
   an integrating means charging an output node having an original no-jitter potential value, the integrating means charging the output node for the duration of the first phase error in one of a first direction if the first phase error has a first sign and a second direction if the first phase error has a second sign, the integrating means charging the output node for the duration of the second phase error in one of the first direction if the second phase error has the second sign and the second direction if the second phase error has the first sign.

9. The apparatus of claim 8 further comprising:
   a reset means to reset the output node to the original no-jitter potential value after the comparison means performs a comparison between the predetermined jitter value and the difference between the first and second phase errors.

10. An apparatus comprising:
    an adaptive equalizer providing at least one of a phase compensation and an amplitude compensation to received data pulses in accordance with a jitter compensation signal to provide equalized data pulses; and
    a jitter detection circuit coupled to receive the equalized data pulses and a reference clock signal, wherein the jitter detection circuit provides the jitter compensation signal indicative of whether a correlated jitter is within a predetermined range, wherein the correlated jitter corresponds to a difference between a first phase error and a second phase error, wherein the first phase error is determined from a first equalized data pulse and a first reference clock pulse, wherein the second phase error is determined from a second equalized data pulse and a second reference clock pulse.

11. The apparatus of claim 10 wherein the first phase error is measured between a specified edge of the first equalized data pulse and a specified edge of the first reference clock pulse, wherein the second phase error is measured between a specified edge of the second equalized data pulse and a specified edge of the second reference clock pulse.

12. The apparatus of claim 11 wherein the first and second equalized data pulses are consecutive.

13. The apparatus of claim 10 wherein the reference clock pulses are derived from the received data pulses.

14. The apparatus of claim 10 wherein the jitter detection circuit further comprises:
    a phase detector determining the first and second phase errors;
    an integrator coupled to provide a correlated jitter signal corresponding to the difference of the first and second phase errors; and
    a comparator coupled to provide a jitter compensation signal indicative of whether the difference exceeds the predetermined jitter value.

15. A method comprising the steps of:
    a) comparing a specified edge of a first data pulse with a specified edge of a first clock pulse to provide a first phase error;
    b) comparing a specified edge of the second data pulse with a specified edge of the second clock pulse to provide a second phase error; and
    c) providing a jitter compensation signal indicative of whether a correlated jitter signal is within a predetermined range, wherein the correlated jitter signal corresponds to a difference between the first and second phase errors.

16. The method of claim 15 wherein step c) further comprises the steps of:
   i) charging an output node in a first direction for a duration of the first phase error in one of a first direction if the first phase error has a first sign and a second direction if the first phase error has a second sign; and
   ii) charging the output node in the first direction for the duration of the second phase error in one of a first direction if the second phase error has the second sign and a second direction if the second phase error has the first sign.

17. The method of claim 16 further comprising the step of:
   iii) resetting the output node to a no-jitter value after determining whether the difference between the first and second phase is within the acceptable range.

18. The method of claim 15 wherein step c) further comprises the step of:
   i) comparing the difference with at least one predetermined value to determine if the correlated jitter is within the acceptable range.

19. The method of claim 15 further comprising the step of:
   d) adjusting an adaptive equalizer in accordance with the correlated jitter signal to adjust at least one of a phase compensation and an amplitude compensation for the data signals.

20. The method of claim 15 wherein the first and second clock pulses are generated through recovery from a plurality of data signals including the first and second data pulses.

21. A method comprising the steps of:
   a) generating an original phase error from an original data signal and an original clock signal;
   b) generating a subsequent phase error from a subsequent data signal and a subsequent clock signal;
   c) measuring a correlated jitter signal as the difference between the original and subsequent phase errors; and
   d) providing a jitter compensation signal indicative of whether the correlated jitter signal exceeds a predetermined value.

22. The method of claim 21 further comprising the step of:
   e) providing at least one of a phase compensation and an amplitude compensation to the data signals in accordance with the jitter compensation signal.

* * * * *